US005704901A

United States Patent [19]

Meister

[11] Patent Number: 5,704,901

[45] Date of Patent: Jan. 6, 1998

[54] EQUINE SPECULUM

[76] Inventor: Jack A. Meister, 1049 Pomfret Rd., Hampton, Conn. 06247

[21] Appl. No.: 617,437

[22] Filed: Mar. 18, 1996

[51] Int. Cl.[6] .............................. A01B 11/02; A01B 11/06

[52] U.S. Cl. .............................................. 600/243; 600/244

[58] Field of Search .................................... 600/243, 244, 600/184, 217, 238, 239, 201, 235, 237, 216; 433/140, 136, 138, 93; 119/821, 831, 833; 54/61, 7, 8

[56] References Cited

U.S. PATENT DOCUMENTS

| | | | |
|---|---|---|---|
| 403,534 | 5/1889 | Holland | 600/244 |
| 457,911 | 8/1891 | Edwards | 600/243 |
| 548,194 | 10/1895 | Haussmann | 600/244 |
| 574,591 | 1/1897 | Walker | 600/244 |
| 803,418 | 10/1905 | Hineman | 600/244 |
| 1,089,653 | 3/1914 | Littauer | 600/244 |
| 1,137,585 | 4/1915 | Craig | 600/239 |
| 1,154,748 | 9/1915 | Dunn | 600/244 |
| 2,011,445 | 8/1935 | Hiner | 600/243 |
| 2,775,965 | 1/1957 | Montgomery | 600/244 |

*Primary Examiner*—Richard J. Apley
*Assistant Examiner*—Denise Pothier
*Attorney, Agent, or Firm*—M. P. Williams

[57] ABSTRACT

An equine speculum has an extension (17*b*) to the upper jaw piece (17*a*) to which the speculum-controlling handle (28*a*) is joined by a pivot (30), there being a slot (44) in the handle to permit relative motion of a pivot (29) that joins the handle to the lower jaw piece (18). An extension (46) below the lower jaw piece provides additional teeth (47) to permit latching the speculum in various open positions.

11 Claims, 4 Drawing Sheets

EQUINE SPECULUM

TECHNICAL FIELD

This invention relates to an improved equine speculum.

Background Art

Equine speculums have been utilized for over one hundred years. Some early speculi are illustrated in U.S. Pat. Nos. 548,194, 925,380, 1,089,653 and 1,154,748. A later model of an equine speculum, which is probably the most widely used form of speculum in the prior art, is shown in FIG. 1. The speculum 10 is slipped onto the head of a horse 11 in the same manner as an ordinary bridle. The speculum 10 is retained on the horse's head by means of an adjustable nose strap 12 and an adjustable head strap 13, which fits behind the ears 14 of the horse. The speculum comprises an upper jaw piece 17 and a lower jaw piece 18, each are generally U-shaped so they extend from one side of the horse's head around past the teeth and lips to the other side of the horse's head. Within the front, distal U-shape portion of each piece, there is disposed a generally crescent-shaped tooth plate 19, 20 upon which the upper and lower teeth and lips respectively rest. The extreme distal ends of both sides of upper and lower jaw pieces 17, 18 are connected on each side of the horse's head by pivots 23. On each side of the horse's head, the upper jaw piece 17 has two slots 24, 25, the slots 24 engaging the nose strap 12 and the slots 25 engaging the head strap 13. A handle 28 includes identical pieces on each side of the horse's head, each piece joined to the lower jaw piece 18 on each side by pivots 29. On each side, the handle 28 is provided moveable pivot points 30 which are each disposed on a related pivot piece 31 which in turn are each connected to a corresponding side of the upper jaw piece 17 by means of pivots 32. Rotation of the handle 28 clockwise about the pivots 30 will force the lower jaw piece 18 to rotate counterclockwise about the pivots 23, thereby opening the horse's mouth. When the horse's mouth has been opened sufficiently, a single toothed pawl 35 will engage one of three teeth 36 on the lower jaw piece so as to keep the handle 28 in the operated position, with the horse's mouth open. A thumb screw 37 may be utilized to prevent the pawl 35 from disengaging the teeth 36 while performing oral procedures on the horse. The pawl 35 is urged toward the teeth 36 about a pivot 38 by means of a finger spring 39. The handle 28 includes a typically round gripping piece 40 that extends from the piece on one side of the horse's head to the piece on the other side of the handle 28, which can be pulled forward to rotate the handle clockwise to open the horse's mouth, and which also may be used as a hand-hold to control the position of the horse's head, once the mouth is open and the pawl 35 is locked to one of the teeth 36.

Advantages of a speculum of this type include the ease of slipping it onto the horse's head, in a fashion to which the horse has been accustomed with respect to an ordinary bridle. The proximal end of the speculum applies acupressure to the horse's mouth (in a manner similar to the old war bridles) which causes autosecretion of a morphine-like sedative into the horse's system, thereby sedating the horse and rendering the horse more easily handled during a dental or other mouth procedure.

The problem with the speculum of FIG. 1 is that the pivot piece 31 not only represents extra weight, it also represents one more piece of hardware that interferes with the practitioner's access to the horse's mouth. It does not operate optimally when opening the horse's mouth.

Disclosure of Invention

Objects of the present invention include an equine speculum which has fewer parts, is lighter, and is easier to use than those in the prior art, and one which provides the practitioner with good access to the horse's mouth.

According to the present invention, the upper jaw piece of an equine speculum extends past the point where it is pivoted to the lower jaw piece of the speculum, thereby providing a pivot point for the speculum-opening handle; the handle is pivoted to the jaw pieces in a slotted manner to permit variable positioning of a pivot point with respect to the point at which the lower jaw piece is pivoted to the upper jaw piece. This feature of the invention eliminates the use of a pivot piece and eliminates one of the pivots on each side, thereby reducing the force necessary to open the horse's mouth.

According to the invention further, instead of having teeth disposed only on the lower jaw piece for engagement with a pawl on the handle, to lock the speculum in an open position, the present invention includes a plurality of teeth extending downward from the lower jaw piece, and includes sufficient teeth to span a lockable position which extends over a minimum of about eight centimeters, or more. The invention is readily implemented to provide a very wide, open access to the side areas of the horse's mouth.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
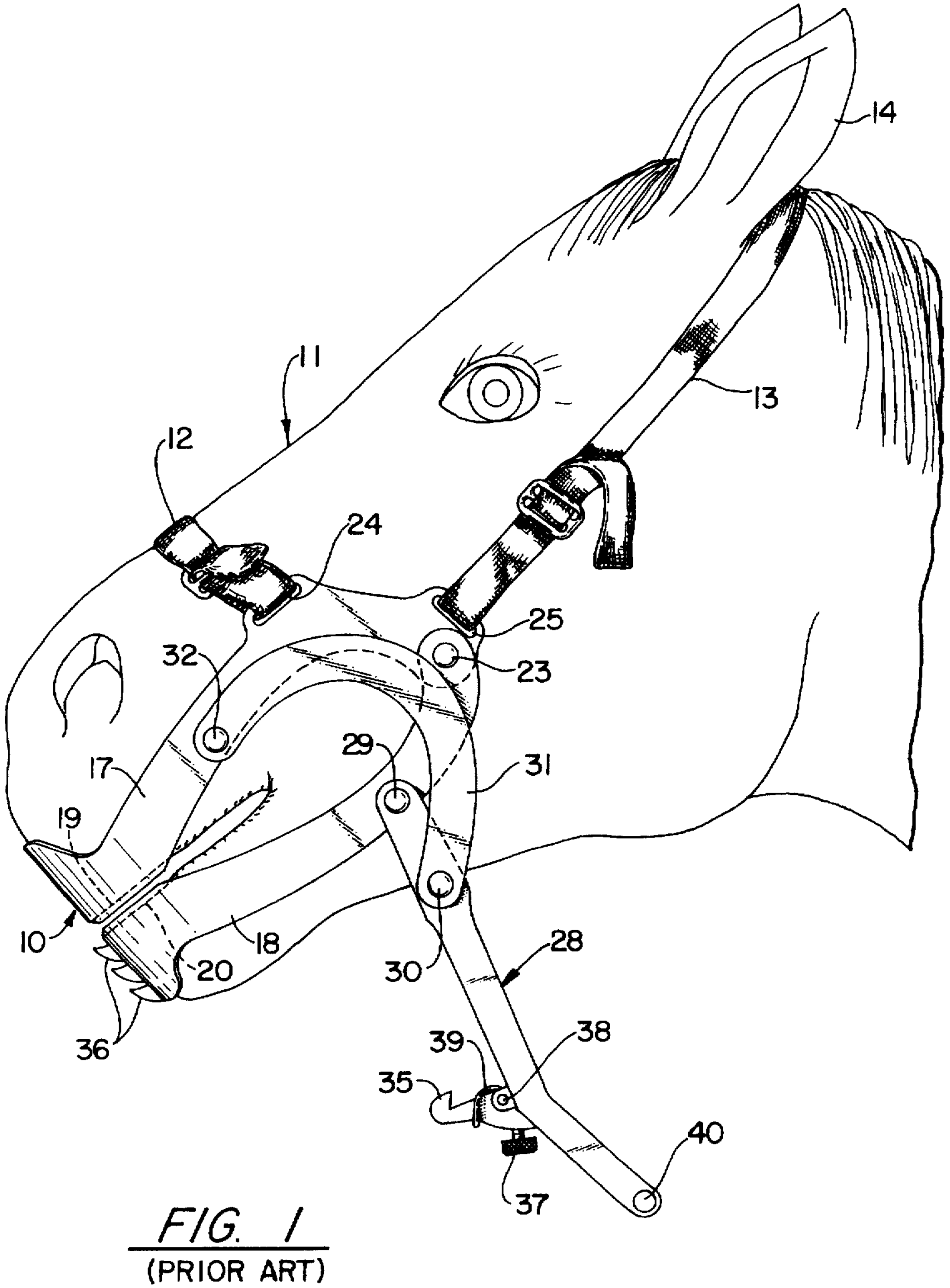
FIG. 1 (PRIOR ART)
FIG. 1 is a side elevation view of a prior art equine speculum strapped to the head of a horse, with the horse's mouth closed.
Figure 2:
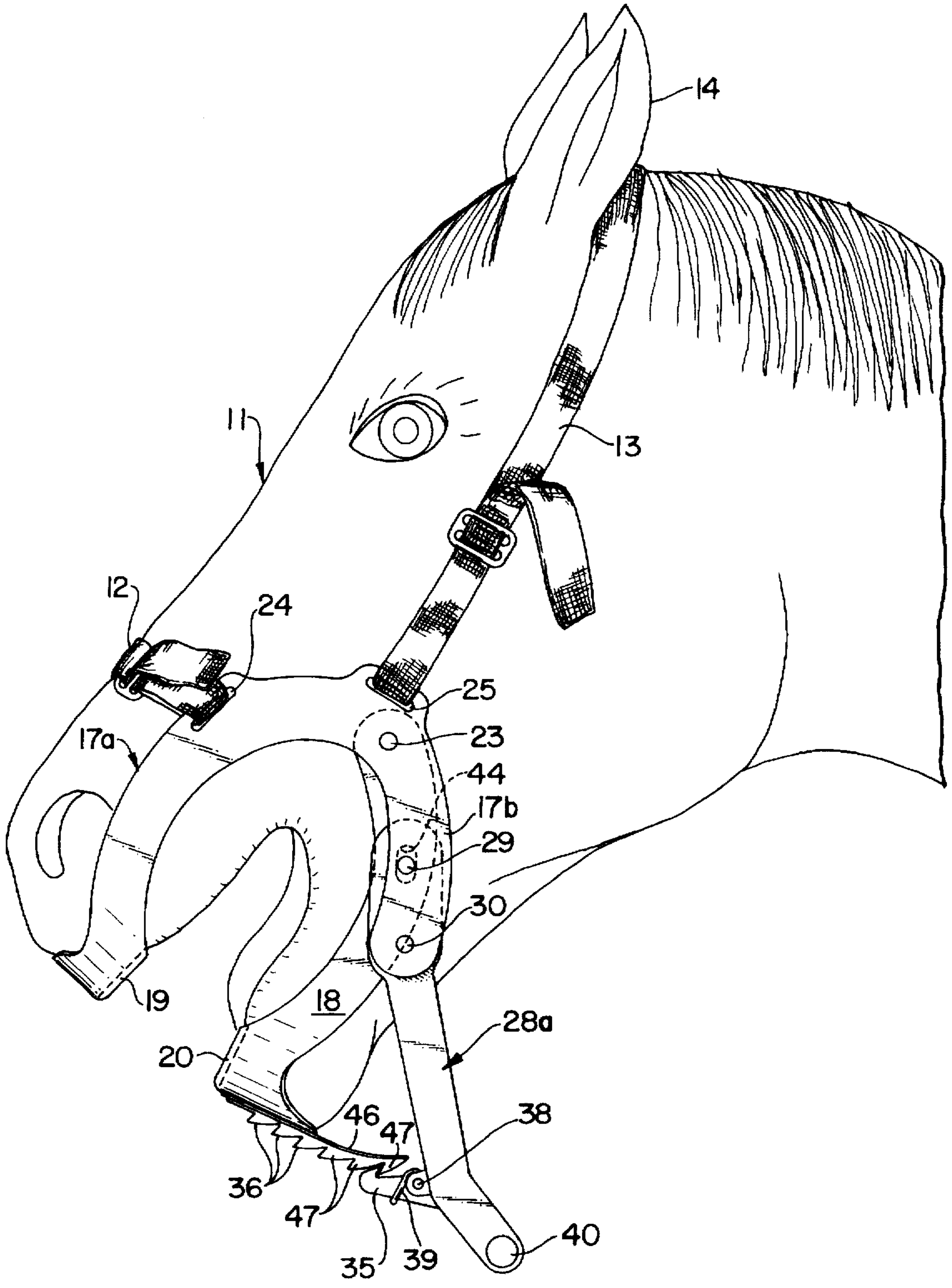
FIG. 2 is a side elevation view of an equine speculum according to the invention strapped to the horse's head with the horse's mouth partially open.

Referring now to FIG. 2, those parts of a speculum in accordance with the present invention which are (or may be) functionally identical to those in the prior art speculum of FIG. 1 have the same reference numerals. Those parts which are substantially similar, but altered in some fashion, have the same reference numerals, but with a letter suffix. The most notable distinctions are the fact that the upward jaw piece 17*a* has an extension 17*b* that extends downwardly and forwardly past the point where the upper jaw piece is joined to the lower jaw piece by the pivot 23, generally along the lower jaw piece 18 to a point midway thereof, so that the handle 28*a* is joined to the extension 17*b* by the pivot 30, instead of being joined to the pivot piece 31 as in the prior art. The second notable difference is that the handle 28*a* has a slot 44 for receiving the pivot 29, rather than receiving the pivot 29 in a round hole, as in the prior art speculum of FIG. 1. The slot 44 allows the distance between the pivot 29 and the pivot 23 to vary somewhat as the handle is moved from a fully closed position to a fully open position, and vice versa. This in turn permits the pivot point 30 to be rigid with respect to the pivot point 23, thereby eliminating the need for the pivot piece 31.

Figure 3:
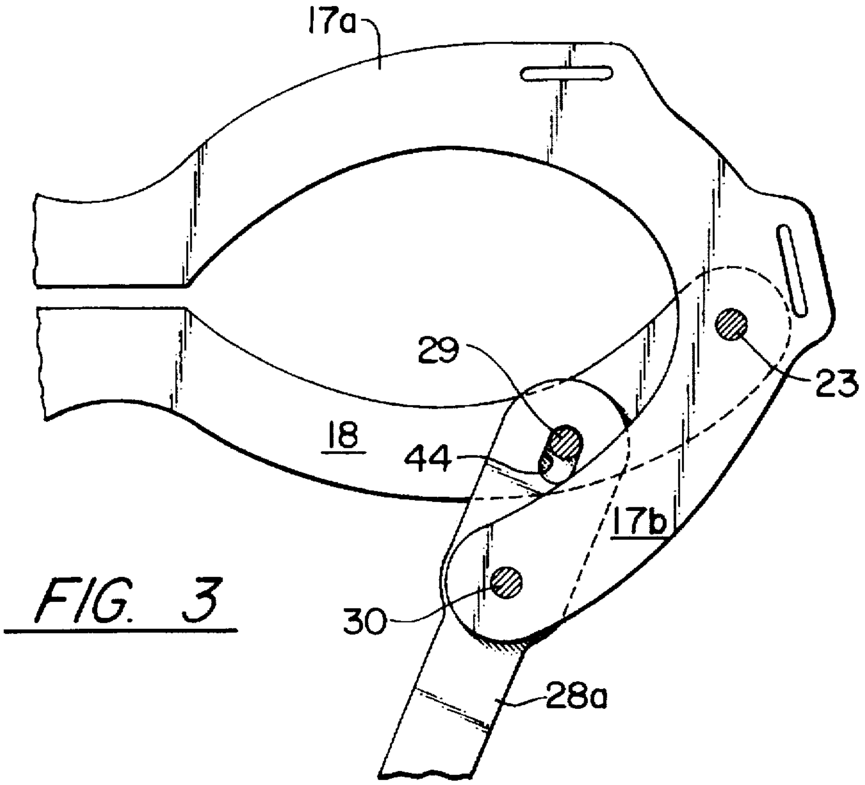
FIG. 3 is a fragmentary side elevation view of the speculum of FIG. 2 in the closed-mouth position.
Figure 4:
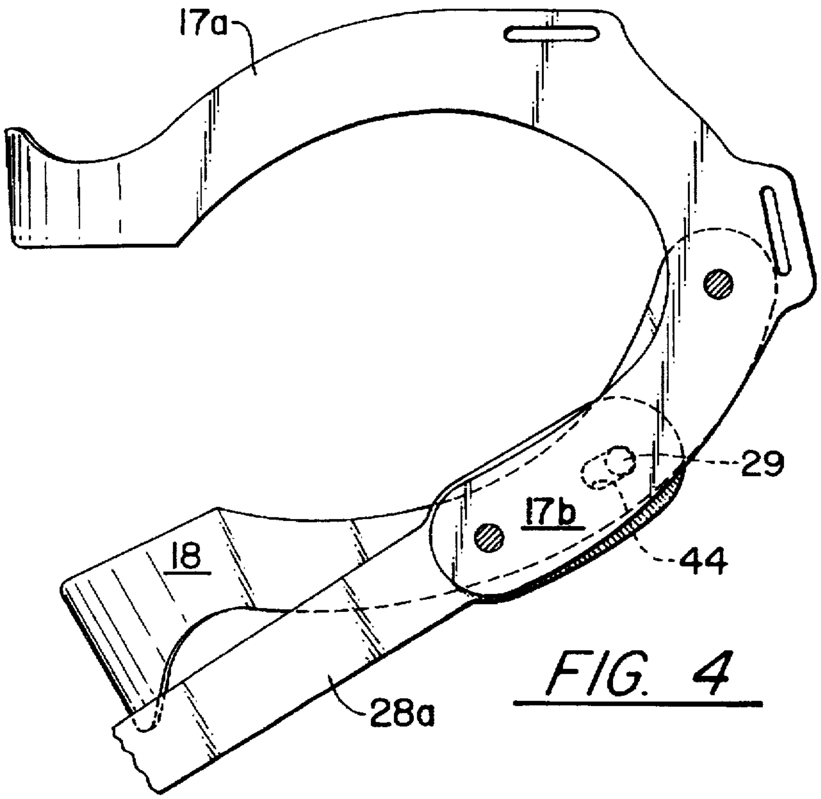
FIG. 4 is a fragmentary side elevation view of the speculum of FIG. 2 in a substantially opened-mouth position.

This feature is illustrated more fully by comparison of FIGS. 3 and 4 with FIG. 2. In FIG. 3, the speculum is closed and the handle 28*a* is in a rear or counterclockwise position, and the pivot 29 is in the distal or rearward area of the slot 44. In FIG. 2, the handle 28*a* has been rotated clockwise just past the point where the speculum is half-way open, and the pivot 29 is in the proximal or forward area of the slot 44. In FIG. 4, the handle 28*a* is in the full counterclockwise position with the speculum essentially completely open, and the pivot 29 is once again in the distal or rearward area of the slot 44.

The invention may also be practiced by providing a transverse slot on the lower jaw 18 to receive the pivot 29 and utilizing a hole on the handle 28*a* to receive the pivot 29. The invention may also be practiced by providing the slot in the vicinity of the pivot 30, either on the handle 28*a* or on the extension 17*b* of the upper jaw piece. However, having the longitudinal slot on the handle 28*a*, as seen most clearly in FIG. 3, is deemed preferred because the device works easier with the pivots 23 and 30 in round holes.

Figure 5:
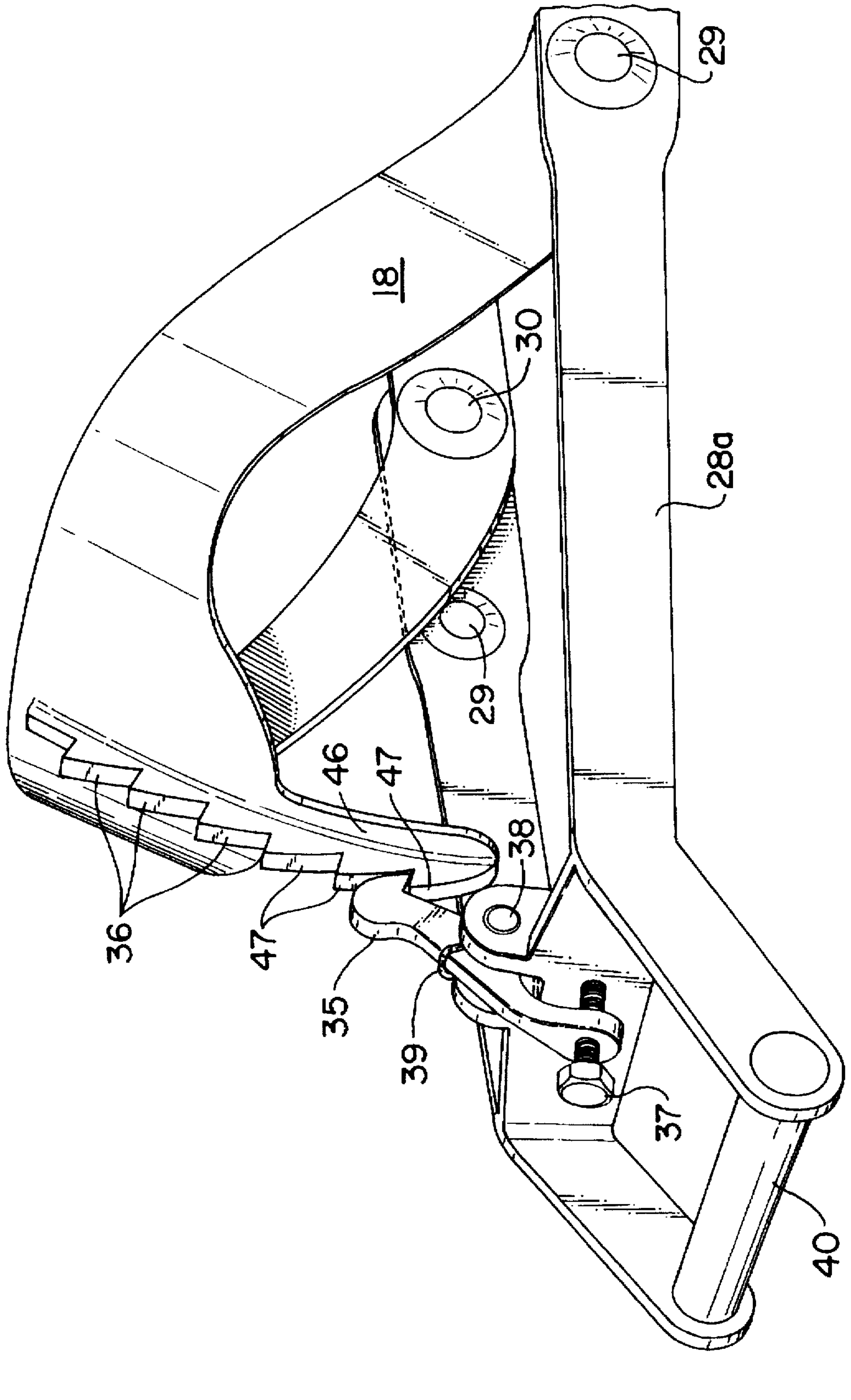
FIG. 5 is a fragmentary perspective view of the proximal end of the lower jaw and handle of the speculum of FIG. 1.

The speculum of FIG. 2 in accordance with the present invention is also easier to use because, as seen more clearly in FIG. 5, the lower jaw 18 has an extension 46 depending downwardly therefrom upon which additional teeth 47 are disposed. This permits the practitioner to latch the speculum in a slightly open position and other varying degrees of openness, allowing the horse to get used to it, and allowing the practitioner to steady the horse in the process of opening the horse's mouth, if desired. According to the invention, the number and size of the teeth may be arranged to extend on the order of eight centimeters or more; the improvement allows latching in various degrees of openness from approximately half open to fully open.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An equine speculum comprising:

a generally U-shaped upper jaw piece having an upper leg extending along each side of the horse's mouth from a generally crescent-shaped upper tooth plate disposed in the forward, proximal end thereof to receive the upper teeth and lip of the horse, having a nose strap slot midway along each of said legs to receive a nose strap, and having a head strap slot at the extreme rear, distal end of each of said legs for receiving a head strap;

a generally U-shaped lower jaw piece having a lower leg extending along each side of the horse's mouth from a generally crescent-shaped tooth plate disposed in the forward, proximal end thereof for receiving the lower teeth and lip of the horse, the extreme rearward end of each of said lower legs being joined by a corresponding one of a related pair of pivot joints to the extreme rearward end of the corresponding one of said upper legs;

each of said upper legs having an extension which extends downwardly and forwardly from the corresponding one of said pivot joints, in the general vicinity of the corresponding one of said lower legs, and having a forward free end substantially midway along the corresponding one of said lower jaw pieces; and a handle having two handle legs, each extending generally along a corresponding one of said lower legs and connected thereto by a corresponding one of a related pair of first handle pivot joints, each of said handle legs connected to a free end of a corresponding one of said extensions by a corresponding one of a related pair of second handle pivot joints, one of said related pairs of handle pivot joints being slotted so as to permit a varying distance between the pivots of the other of said related pairs of handle pivot joints as said handle is rotated to move said lower jaw piece from a substantially closed position to a substantially open position.

2. A speculum according to claim 1 wherein said first handle pivot joints are slotted.

3. A speculum according to claim 2 wherein each of said first handle pivot joints includes a slot in the corresponding one of said handle legs.

4. A speculum according to claim 1 wherein said one related pair of handle pivot joints includes a slot in the corresponding one of said handle legs.

5. A speculum according to claim 1 wherein said lower jaw piece has an extension extending downwardly from the centermost proximal, forward portion thereof with a plurality of forward-facing teeth disposed thereon and on said lower jaw piece; and a pawl on said handle for engaging respective ones of said teeth when said speculum is in corresponding open positions, wherein said teeth extending along a length of said lower jaw piece and said extension to permit said pawl to engage one of said teeth when said speculum is between approximately halfway open and substantially fully open.

6. A speculum according to claim 5 wherein said teeth extend along a length of said lower jaw piece and said extension which is about eight centimeters.

7. An equine speculum comprising:

a generally U-shaped upper jaw piece having an upper leg extending along each side of the horse's mouth from a generally crescent-shaped upper tooth plate disposed in the forward, proximal end thereof to receive the upper teeth and lip of the horse, having a nose strap slot midway along each of said legs to receive a nose strap, and having a head strap slot at the extreme rear, distal end of each of said legs for receiving a head strap;

a generally U-shaped lower jaw piece having a lower leg extending along each side of the horse's mouth from a generally crescent-shaped tooth plate disposed in the forward, proximal end thereof for receiving the lower teeth and lip of the horse, the extreme rearward end of each of said lower legs being joined by a corresponding one of a related pair of pivot joints to the extreme rearward end of the corresponding one of said upper legs;

said upper legs each having an extension which extends downwardly and forwardly from the corresponding one of said pivot joints, in the general vicinity of the corresponding one of said lower jaw pieces, and having a forward free end substantially midway along the corresponding one of said lower jaw pieces;

a handle having two handle legs, each extending generally along a corresponding one of said lower legs and connected thereto by a corresponding one of a related pair of first handle pivot joints, each of said handle legs connected to a free end of a corresponding one of said extensions by a corresponding one of a related pair of second handle pivot joints, one of said related pairs of handle pivot joints being slotted so as to permit a varying distance between the pivots of the other of said related pairs of handle pivot joints as said handle is rotated to move said lower jaw piece from a substantially closed position to a substantially open position;

a tooth extension extending downwardly from the centermost proximal, forward portion of said lower jaw piece with a plurality of forward-facing teeth disposed thereon and on said lower jaw piece; and a pawl on said handle for engaging respective ones of said teeth when said speculum is in corresponding open positions, said teeth extending along a length of said lower jaw piece and said extension to permit said pawl to engage one of said teeth when said speculum is between approximately halfway open and substantially fully open.

8. A speculum according to claim 7 wherein said first handle pivot joints are slotted.

9. A speculum according to claim 8 wherein each of said first handle pivot joints includes a slot in the corresponding one of said handle legs.

10. A speculum according to claim 7 wherein said one related pair of first handle pivot joints includes a slot in the corresponding one of said handles.

11. A speculum according to claim 7 wherein said teeth extend along a length of said lower jaw piece and said extension which is about eight centimeters.

* * * * *